(12) United States Patent
Hirtz et al.

(10) Patent No.: US 10,640,414 B2
(45) Date of Patent: May 5, 2020

(54) TRANSPORTATION SYSTEM FOR ANNEALING GLASS CONTAINERS

(71) Applicant: Becton Dickinson France, Le Pont de Claix (FR)

(72) Inventors: Francois Hirtz, Vaulnaveys le Bas (FR); Ronan Garrec, Claix (FR); Edouard Wales, Poisat (FR); Maelle Ligen, Claix (FR)

(73) Assignee: Becton Dickinson France, Le Pont-de-Claix (FR)

( * ) Notice: Subject to any disclaimer, the term of this patent is extended or adjusted under 35 U.S.C. 154(b) by 188 days.

(21) Appl. No.: 15/736,021

(22) PCT Filed: Jun. 15, 2016

(86) PCT No.: PCT/EP2016/063685
§ 371 (c)(1),
(2) Date: Dec. 13, 2017

(87) PCT Pub. No.: WO2016/202825
PCT Pub. Date: Dec. 22, 2016

(65) Prior Publication Data
US 2018/0170791 A1    Jun. 21, 2018

(30) Foreign Application Priority Data
Jun. 16, 2015 (EP) .................................. 15305931

(51) Int. Cl.
| | |
|---|---|
| C03B 35/06 | (2006.01) |
| C03B 25/06 | (2006.01) |
| C03B 35/26 | (2006.01) |
| C03B 40/00 | (2006.01) |

(52) U.S. Cl.
CPC ............ C03B 35/062 (2013.01); C03B 25/06 (2013.01); C03B 35/26 (2013.01); C03B 40/00 (2013.01); *Y02P 40/57* (2015.11)

(58) Field of Classification Search
CPC ......... C03B 35/06; C03B 25/06; C03B 40/00; C03B 35/04; C03B 35/062; C03B 35/085; C03B 35/26
See application file for complete search history.

(56) References Cited

U.S. PATENT DOCUMENTS

| | | | |
|---|---|---|---|
| 3,885,530 A | 5/1975 | Kivlen et al. | |
| 4,628,615 A | 12/1986 | Verheyden | |

FOREIGN PATENT DOCUMENTS

| | | |
|---|---|---|
| DE | 3915718 C1 | 9/1990 |
| DE | 19841042 A1 | 3/2000 |
| EP | 0960863 A2 | 1/1999 |
| (Continued) | | |

*Primary Examiner* — Queenie S Dehghan
(74) *Attorney, Agent, or Firm* — The Webb Law Firm

(57) ABSTRACT

The invention relates to a transportation system for annealing a glass container having a barrel and two extremities, said transportation system including a lath provided with at least two non-metallic inserts, the at least two non-metallic inserts being positioned such that, when a glass container is seated on said transportation system, said glass container is exclusively held by contact between said at least two non-metallic inserts and said barrel in substantially horizontal position which is fixed relative to the lath. The transportation system further includes securing means configured to reversibly firmly secure a clipping portion of said at least two non-metallic inserts into a respective slot of the lath.

12 Claims, 10 Drawing Sheets

(56) References Cited

FOREIGN PATENT DOCUMENTS

| | | |
|---|---|---|
| GB | 1546111 | 5/1979 |
| JP | 2000226117 A | 8/2000 |
| JP | 2009155062 A | 7/2009 |

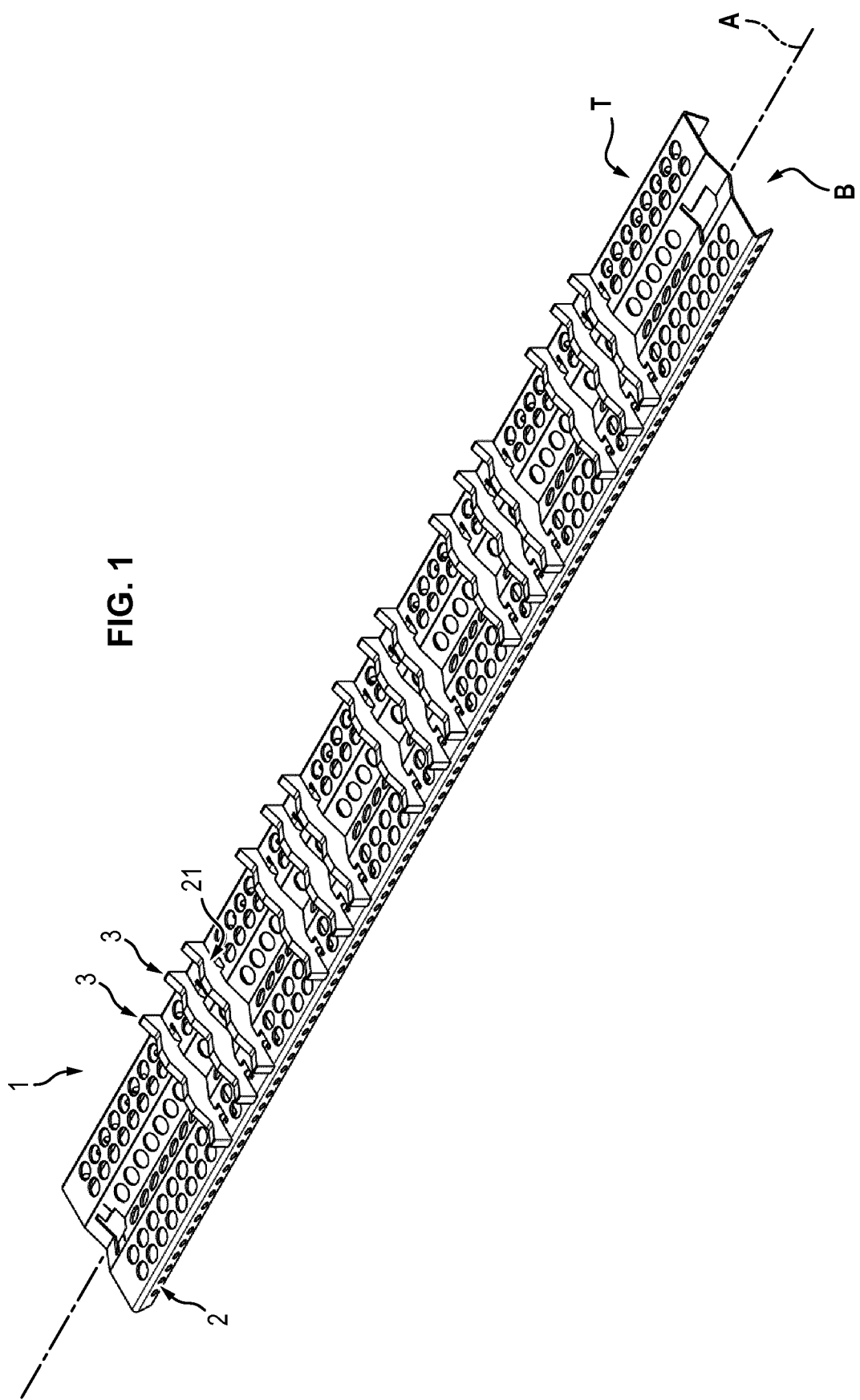

TRANSPORTATION SYSTEM FOR ANNEALING GLASS CONTAINERS

CROSS-REFERENCE TO RELATED APPLICATIONS

This application is the United States national phase of International Application No. PCT/EP2016/063685 filed Jun. 15, 2016, and claims priority to European Patent Application No. 15305931.6 filed Jun. 16, 2015, the disclosures of which are hereby incorporated in their entirety by reference.

BACKGROUND OF THE INVENTION

Field of the Invention

The present invention relates to a system for carrying glass containers, in particular glass containers having a barrel and two extremities such as ampules, cartridges, syringes or vials.

Description of Related Art

The manufacturing process of glass containers generally comprises several operations such as cutting, forming and/or annealing, that are usually performed in line: the transportation of the containers is therefore required between and during each operation. Some of these operations are done at high temperatures, typically selected between 400° C. to 700° C. for the annealing step, according to the type of glass used and/or the targeted shape of the containers.

A transportation system has been described in the European Patent EP0960863 to transport glass containers during such operations, especially during heat treatment or annealing. In this prior art document, the transportation system comprises metallic laths with a triangular shaped cross-section defining a V-shaped groove when several laths are aligned. The glass containers are laid on a seat receiving one of its extremity and an insert receiving the other one. The seat where the extremity of the container is in contact with the lath corresponds to the V-shaped groove defined between two adjacent triangular cross-section laths.

However, it has been found that this prior-art system produces stress and defects in the glass material of the containers extremities. Such defects can lead to breakages during further manufacturing operations, transportation, or even use of the glass containers. This is particularly critical when the glass containers are syringes, as syringes extremities, namely the flange and the tip, that are thin and brittle areas. Breakage of syringe flanges or tips often leads to safety issues as it may prevent safe injections of pharmaceutical products.

Furthermore, this prior-art transportation system also degrades the eccentricity of the glass containers. The eccentricity parameter is an important parameter for cosmetic aspects of the glass containers as well as functional aspects when the glass containers are intended to be used for injection. Indeed, as the glass material may partially flow at the annealing temperature, glass containers may partially lose their cylindrical shape when annealed on a prior-art transportation system, thus leading to unacceptable glass containers. In the case of glass containers intended to be used for injection such as syringes or cartridges, bended containers may become non-functional by preventing the normal motion of a stopper throughout the container barrel.

Finally, the inserts described in the prior-art are permanently fixed to the metallic laths to avoid disconnection that may occur due to the vibrations and heat constraints during processing. Such permanent connections imply to design and use specific laths for each kind or size of glass containers. This requires the storage and the replacement of different laths depending on the types and dimensions of the glass containers that are manufactured. Moreover, any format changes would require adjustment of the equipment and re-validation of the machines for each modification. These constraints lead to low-efficiency and low-flexibility manufacturing processes.

There is therefore a need for a transportation system for annealing glass containers that overcomes the prior-art deficiencies.

SUMMARY OF THE INVENTION

The object of the present invention is a transportation system and a method that avoid weakening the glass containers extremities during annealing. Preferably, such a transportation system and such method allow preserving the glass containers cylindrical shape during the annealing step. Finally, a highly flexible transportation system allowing the production of all kind of glass containers in a quick and efficient way is also desirable.

This object is achieved by a transportation system for annealing a glass container having a barrel and two extremities, the transportation system comprising a lath provided with at least two non-metallic inserts. The at least two non-metallic inserts are positioned such that, when a glass container is seated on said transportation system, the glass container is exclusively held in a substantially horizontal position by contact between said at least two non-metallic inserts and said barrel, which prevents degrading the glass containers cylindrical shape. The system further comprises securing means able to reversibly firmly secure a clipping portion of said at least two non-metallic inserts into a respective slot of the lath. These securing means allow both a firm connection of the inserts to the lath and a quick customization of the transportation system according to the type and size of glass containers submitted to annealing.

In contrast to the prior-art transportation system, the transportation system according to the present invention eliminates direct contacts between the thin and brittle extremities of the glass container and the transportation system. This avoids producing stress and defects such as micro-cracks in the container extremities thus leading to a safer, stronger and more resistant glass container.

According to an embodiment, the slots are V-shaped.

According to an embodiment, the lath further comprises two side portions and the clipping portion of the inserts further comprises two abutment edges, each abutment edge being in abutment on one of the side portions of the lath, the two side portions and the abutment edges forming part of said securing means.

According to an embodiment, the securing means comprise two oblique arms protruding into the slot in tight frictional contact with a lateral edge of the clipping portion of a respective insert accommodated in the slot.

Advantageously, the inserts may be made of carbon or ceramic.

According to an embodiment, the inserts further comprise a seat portion having at least one seat intended to contact part of a glass container barrel.

Preferably, the at least one seat has a curved edge.

The lath may advantageously be made of stainless steel.

According to an embodiment, the lath further defines a longitudinal symmetry axis and the at least two parallel slots are perpendicular to said longitudinal symmetry axis.

Besides, the lath may advantageously comprise a central portion extending along a longitudinal axis of symmetry of said lath and two side portions located on both sides of said central portion, and the parallel slots extend through said central and side portions of the lath.

The invention further relates to a transportation system as described above, which further comprises glass containers having a barrel and two extremities, wherein each glass container is lying on at least two inserts only by a contact between said barrel and each of said at least two inserts.

The object of the present invention is further achieved by a method for annealing a glass container having a barrel and two extremities, the method comprising:
  providing a transportation system as described above,
  seating a glass container onto at least two non-metallic inserts firmly secured to the lath of the transportation system, so that the glass container is exclusively held by contact between said at least two non-metallic inserts and said barrel,
  carrying the at least one glass container toward an annealing oven thanks to the transportation system, said at least one glass container being motionless relative to the transportation system.

BRIEF DESCRIPTION OF THE DRAWINGS

The present invention will now be described in greater detail based on the following description and the appended drawings, in which:

FIG. 1 is a perspective view of a transportation system according to an embodiment of the present invention.

DESCRIPTION OF THE INVENTION

FIG. 1 shows a transportation system 1 intended to carry glass containers during manufacturing, the transportation system comprising a lath 2 provided with slots 21 and inserts 3 placed into the slots 21. Such laths are preferably used during heat treatments applied on glass containers, for example when the glass containers are brought in annealing ovens. During transportation, the glass containers do not move relative to the lath.

Referring to FIGS. 2A-2D, the lath 2 has a longitudinal and globally planar geometry with a top face T, a bottom face B and a longitudinal symmetry axis A. In use, the lath extends in a substantially horizontal plane.

Figure 2A:
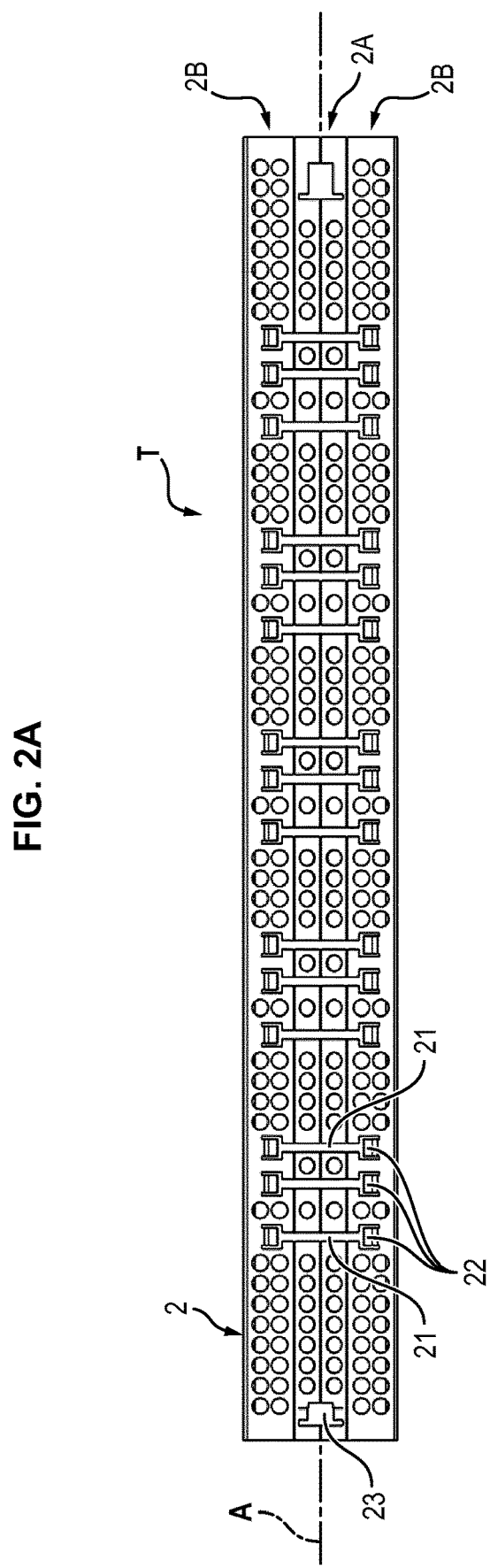
FIGS. 2A, 2B, 2C and 2D are respectively a top view, two perspective bottom views and a cross-sectional side view of the system presented in FIG. 1.
Figure 2B:
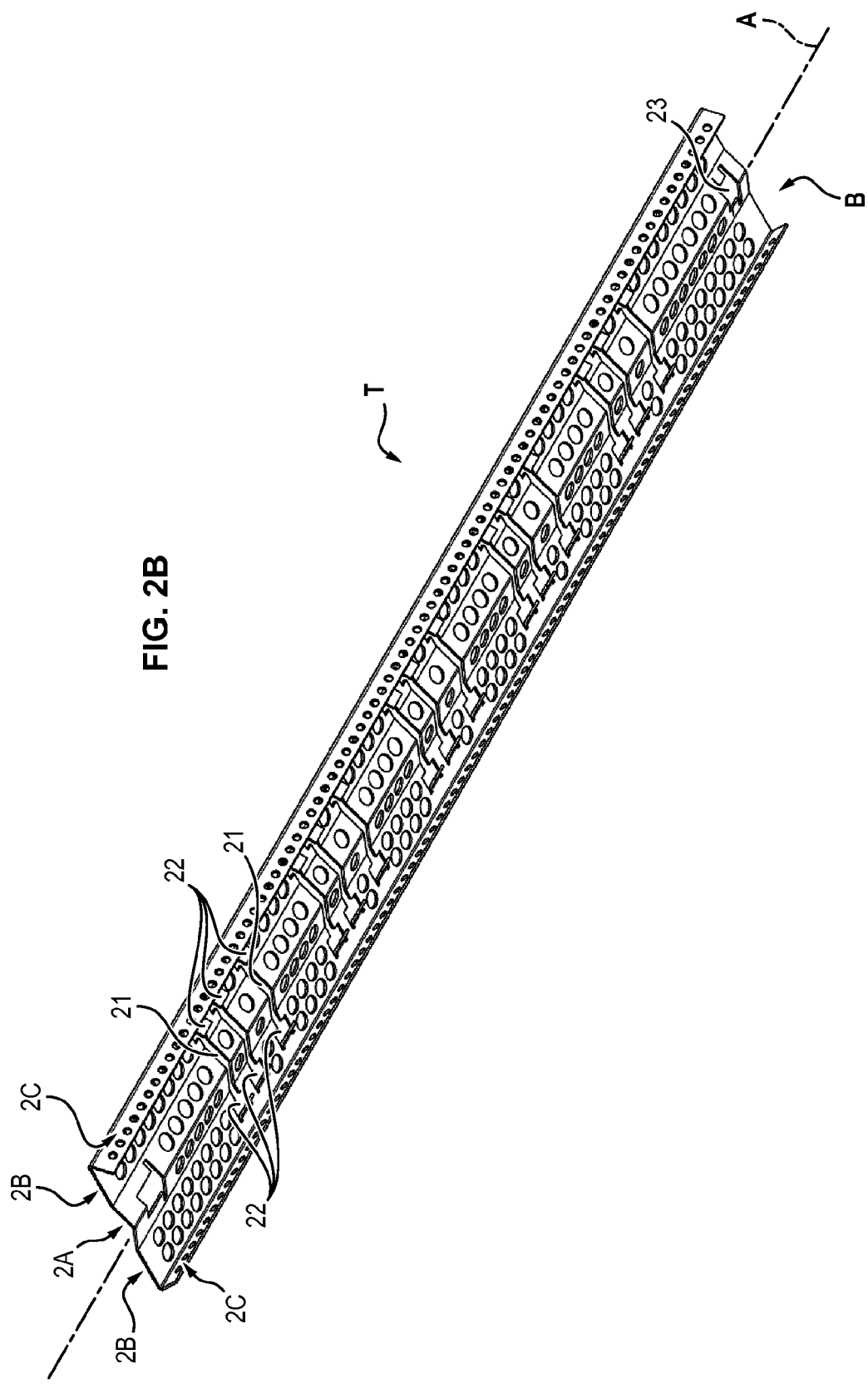
Figure 2C:
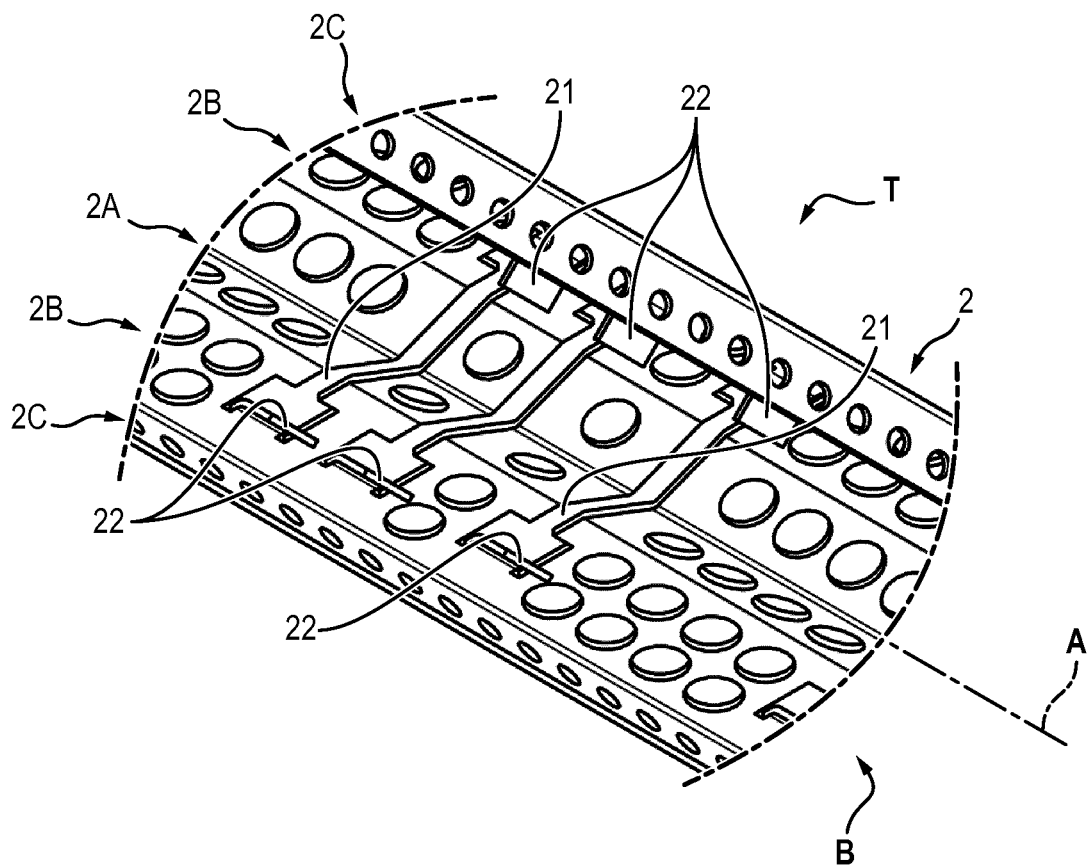
Figure 2D:
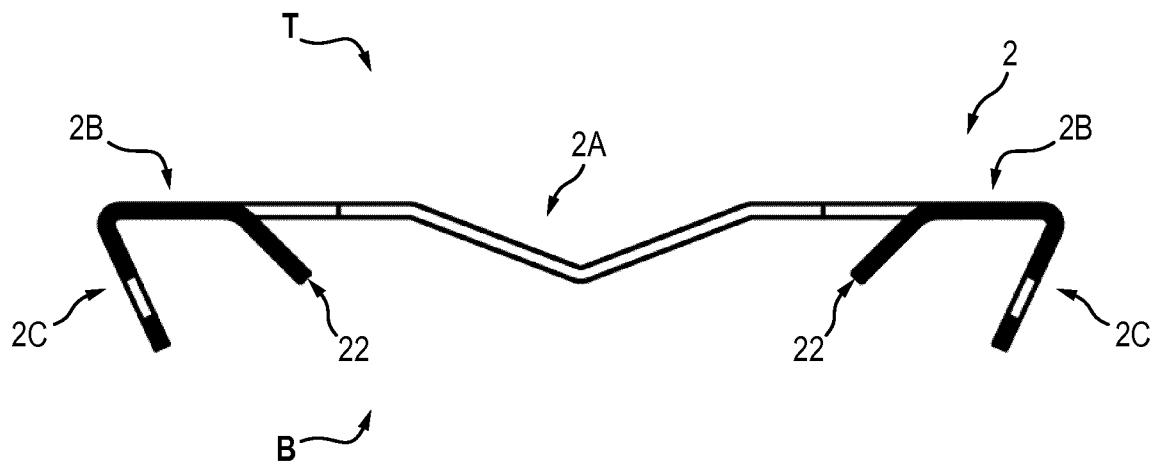

As visible on FIG. 2B, five different portions may be defined along the whole length of the lath 2: a central portion 2A, two side portions 2B and two folded portions 2C (not visible on FIG. 2A). The central portion 2A is located in the middle of the lath along the longitudinal symmetry axis A and has a V-shaped cross-section as shown in FIG. 2D. The two side portions 2B are located on each side of the central portion 2A and define two flat and horizontal areas. Finally, the folded portions 2C are located at each lateral edge of the lath further from the side portions 2B. These folded portions are planar surfaces that are inwardly folded towards the bottom face B of the lath 2.

The globally rectangular configuration of the lath 2 is well adapted to in-line containers manufacturing processes, in particular processes comprising annealing ovens. However, other configurations may be considered according to other manufacturing equipments or for batch manufacturing processes. In such cases, the lath may adopt, for example, a square or circular shape. Generally speaking, the central portion 2A may adopt a non-planar shape and in particular an inverted V-shape, a W-shape or a U-shape.

Several slots 21 are further present along the length of the lath. As seen on FIGS. 2A-2D, all the slots are parallel to each other and perpendicular to the longitudinal symmetry axis A of the lath. Consequently, they extend through the central and side portions 2A, 2B of the lath. As seen on FIG. 2D, two oblique arms 22 protrude into each slot 21 towards the bottom face B of the lath 2. These oblique arms 22 are connected to the side portions 2B and make an angle of about 45° with the plane of the lath 2. Finally, as seen on FIGS. 2A, 2B two attaching grooves 23 are provided on each extremity of the lath 2 on the central portion 2A.

In other embodiments, the parallel slots may have different alignments regarding the longitudinal symmetry axis A as long as they define groups of at least two parallel slots. Indeed, laths with different shapes may have different groups of at least two parallel slots oriented in different directions.

The lath 2 is made of any suitable material able to resist the mechanical and thermal conditions existing in containers manufacturing processes. Steel is a material of choice, in particular stainless steel for its resistance to thermal oxidation and warping, as for example refractory steels as AISI 310 or 316 L. Others refractory materials may also be chosen such as carbon-based composites, austenitic nickel-chromium based super-alloys (Inconel™) or Cermet (composite material composed of ceramic and metal). Optionally, a coating may be used to protect the lath material, from corrosion or wear for example. Such a coating may be selected on purpose by the skilled person, for example diamond-like carbon (DLC), titanium nitride, nickel oxide, chromium oxide or boron oxide.

Figure 3A:
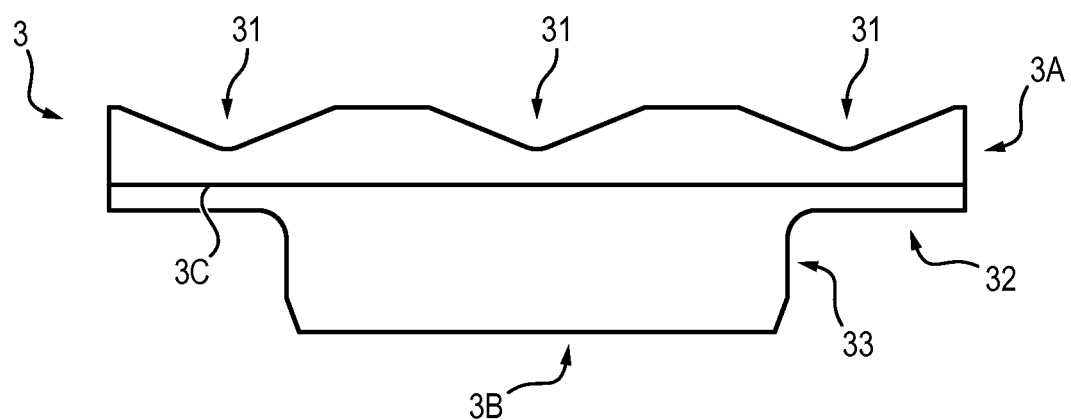
FIGS. 3A and 3B are respectively a lateral view and a perspective view of an insert of a system presented in FIG. 1.
Figure 3B:
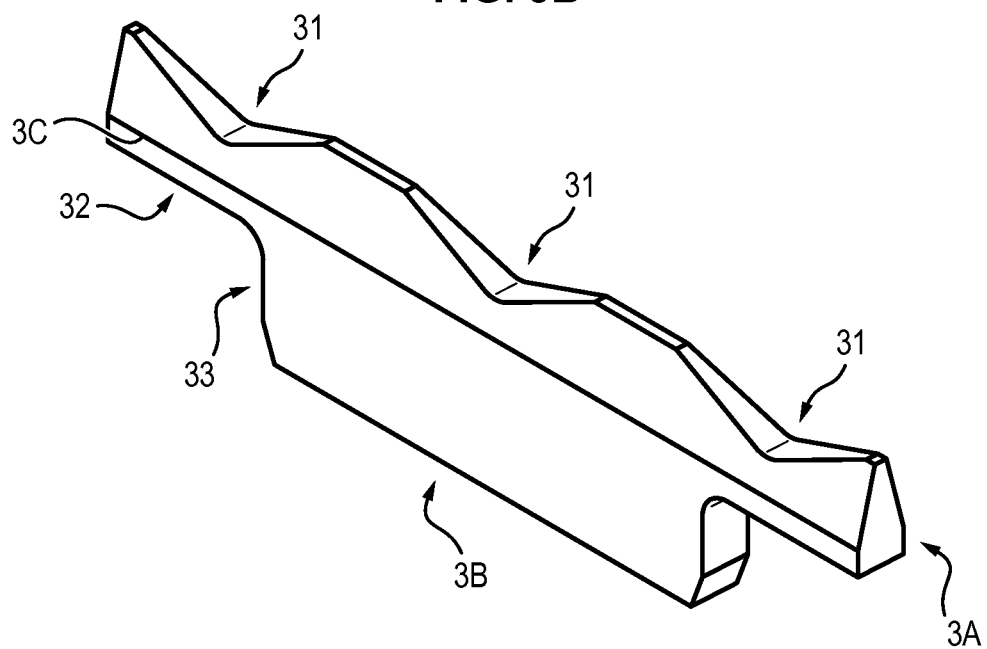

Referring to FIGS. 3A and 3B, an insert 3 is shown. It has globally a T-shaped geometry with a seat portion 3A on its upper part and a clipping portion 3B on its lower part, both portions being separated by a longitudinal plane 3C. As seen in FIG. 3B, the thickness of the seat portion 3A is beveled from the plane 3C to its top edge, on which three V-shaped seats 31 are further provided. The clipping portion 3B has a narrowing width from the plane 3C to its bottom edge which defines two opposite corners each consisting of an abutment edge 32 and a lateral edge 33.

Figure 6A:
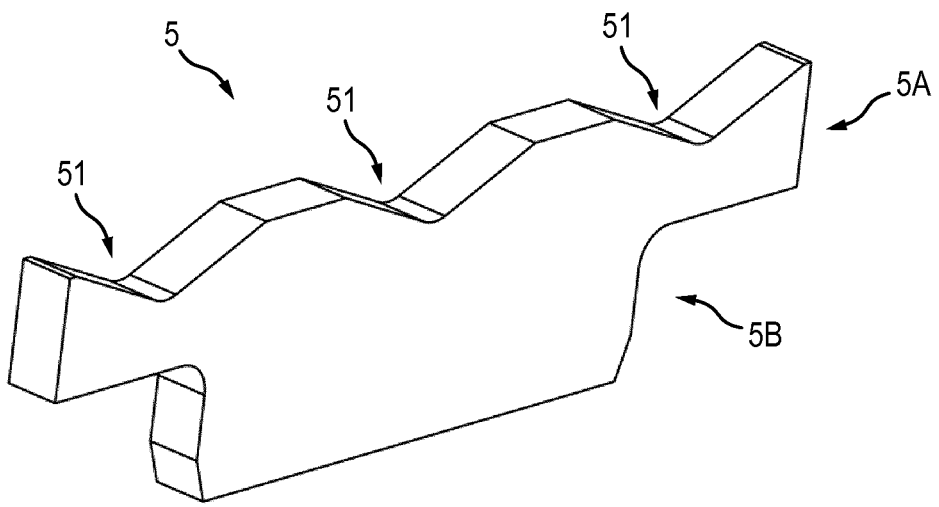
FIGS. 6A and 6B are perspective views of inserts according to other embodiments of the system of FIG. 1.
Figure 6B:
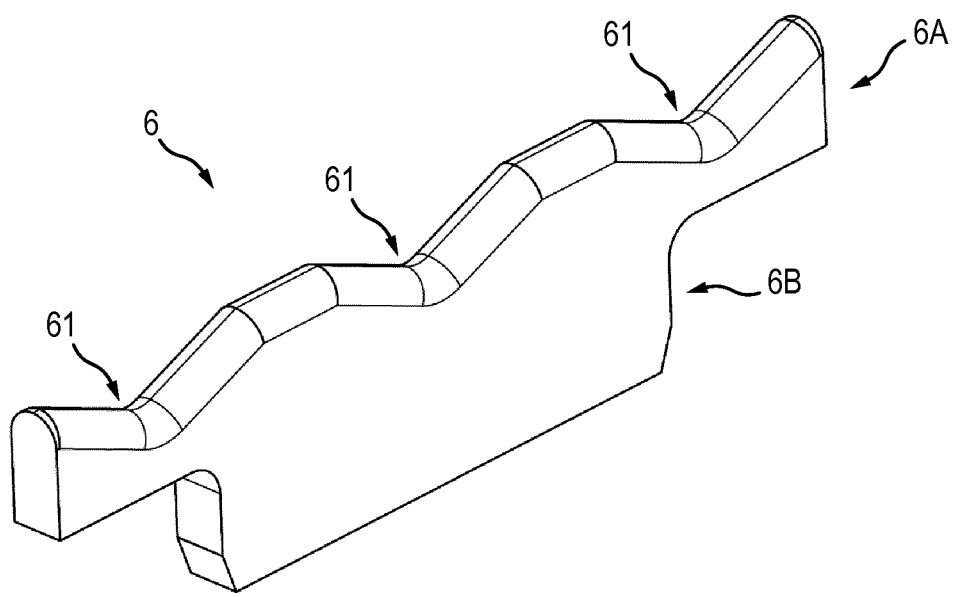

As shown in FIGS. 6A and 6B, different geometries of seats can be realized. For example, the seat portion 5A and the clipping portion 5B of the insert 5 visible in FIG. 6A are not separated by a plane and adopt the same thickness. With such configuration the upper surface of the insert defines seats 51 having a V-shaped geometry with a constant thickness. In another embodiment shown in FIG. 6B, the insert 6 has a constant thickness such as the insert 5 of FIG. 6A, but the top edge of the seat portion 6A defines a curvature radius which leads to seats 61 without any sharp edges.

In other embodiments (not shown), the insert and their corresponding seats may present other profiles adapted to the different sizes and types of the glass containers. For example, vials may require larger seats and two-seat inserts may be more adapted, while four-seat inserts may be preferred for small size cartridges. In parallel, the number of seats per glass containers may also be adapted to the length of the glass containers under manufacturing.

Inserts are preferably made in a single piece of a non-metallic material, preferably carbon. However, they may comprise two or more materials. These materials may be chosen among refractory materials such as ceramic, in particular refractory ceramic such as steatite, alumino-silicate or zirconium oxide. Optionally, the inserts may be coated for example to protect the non-metallic material from oxidation, degradation and wear and/or to further prevent any stains, lines or microcracks on the surface of the glass containers. Such coatings may be selected on purpose by the skilled person, for example chosen among diamond-like carbon (DLC), titanium nitride, nickel oxide, chromium oxide or boron oxide.

Figure 4A:
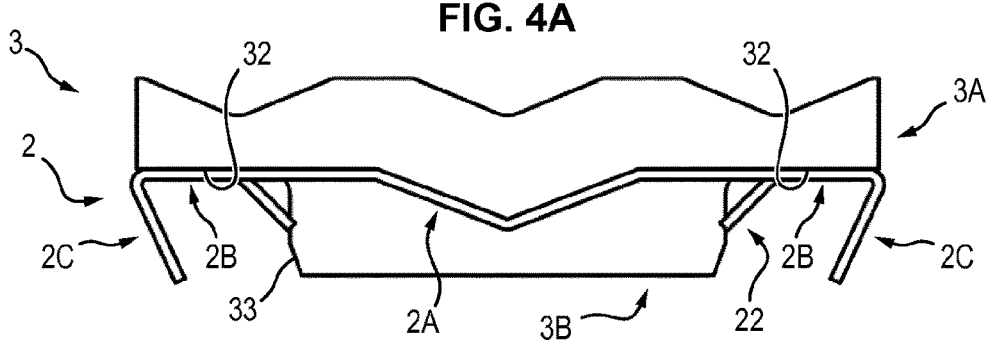
FIGS. 4A, 4B and 4C are respectively a cross-sectional side view, a perspective bottom view and a perspective top view of the system of FIG. 1.
Figure 4B:
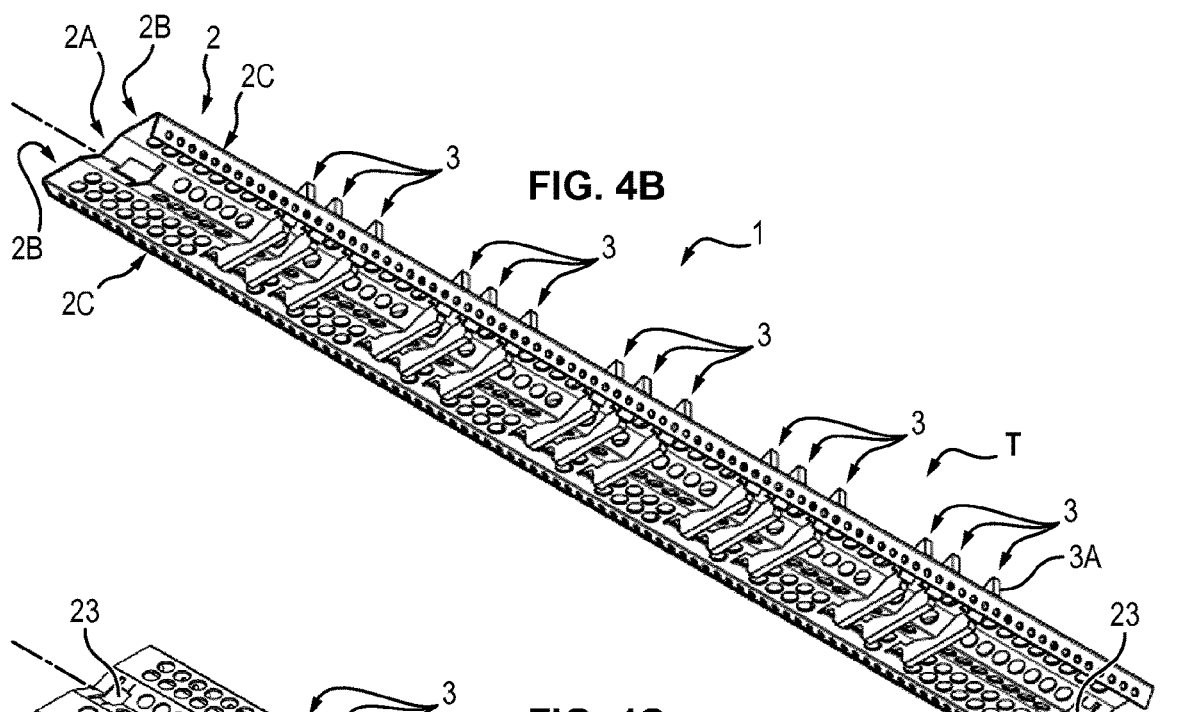
Figure 4C:
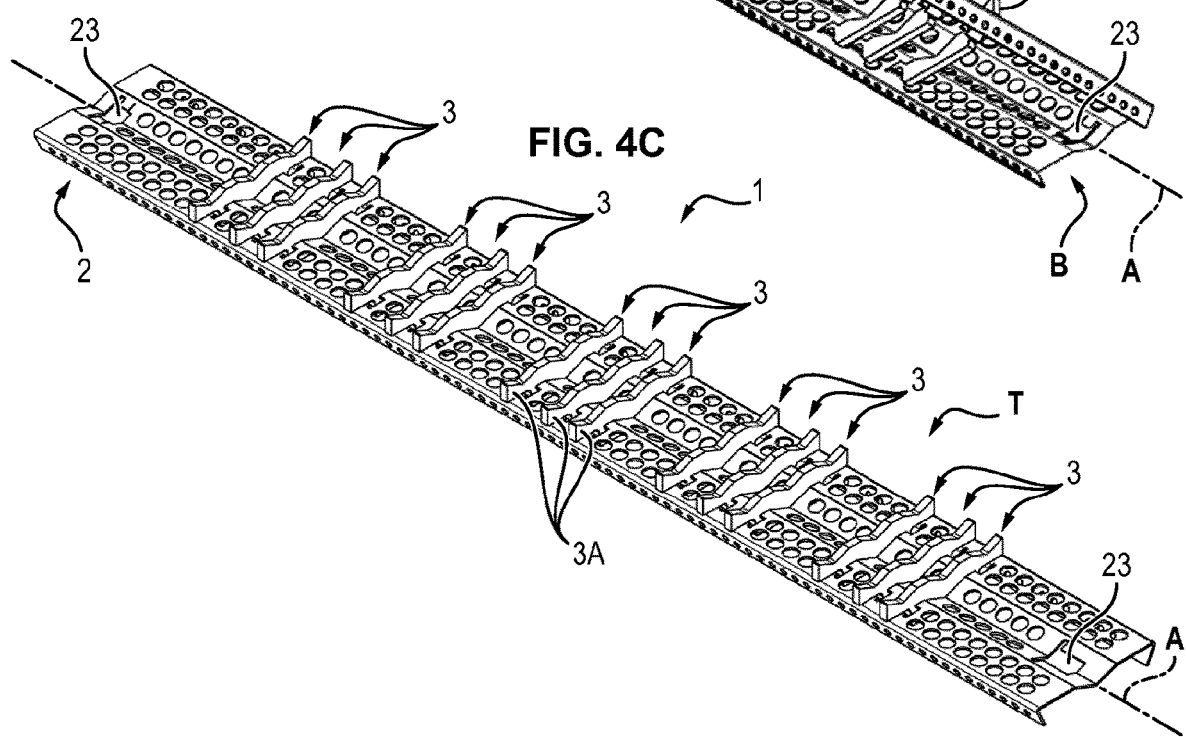

As seen on FIGS. 4A to 4C, the transportation system 1 according to the present invention is ready to be used with inserts 3 placed and plugged into the parallel slots 21 of a lath 2. The clipping portion 3B of the insert 3 is totally inserted through the thickness of the lath 2 and protrudes out from the bottom face B of the lath 2. The abutment edges 32 of the clipping portion 3B are in abutment with the side portions 2B of the lath 2, which prevents the insert 3 from entirely sliding through the parallel slot 21. In addition, the oblique arms 22 of the parallel slots 21 are in tight frictional contact with the lateral edges 33 of the clipping portion 3B of the insert 3, which prevents the disconnection of the insert 3 from the slot 21, for example because of the lath thermal deformation or the transportation system vibrations during manufacturing processes. The interaction of the abutment edges 32 and the lateral edges 33 of the insert 3 with the side portion 2B of the lath 2 and the oblique arm 22 of the parallel slot 21 therefore transversally secures the insert 3 to the lath 2.

Furthermore, as the parallel slot 21 has the same V-shaped cross-section than the V-shaped central portion 2A, movements of the inserts in the longitudinal direction of the lath are prevented and swinging is also prohibited. The V-shaped slot 21, the oblique arms 22 and the side portion 2B of the lath together with the clipping portion 3B, the abutment edges 32 and the lateral edges 33 of the insert 3 thus act as securing means for a firm connection between the lath 2 and the insert 3. The lath itself shows a significant rigidity and a limited thermal deformation due to the specific geometry of its central V-shape portion 2A and its folded portions 2C.

Additionally, the oblique arms 22 may be easily disengaged from the clipping portion 3B with simple tools as small levers or retractors in order to quickly remove the insert 3 from the parallel slot 21. This allows a quick customization of the transportation system, for example when a different configuration of the inserts is required to manufacture glass containers of another type or size. The securing means thus allow a firm and reversible connection of the insert 3 to the lath 2.

Figure 5:
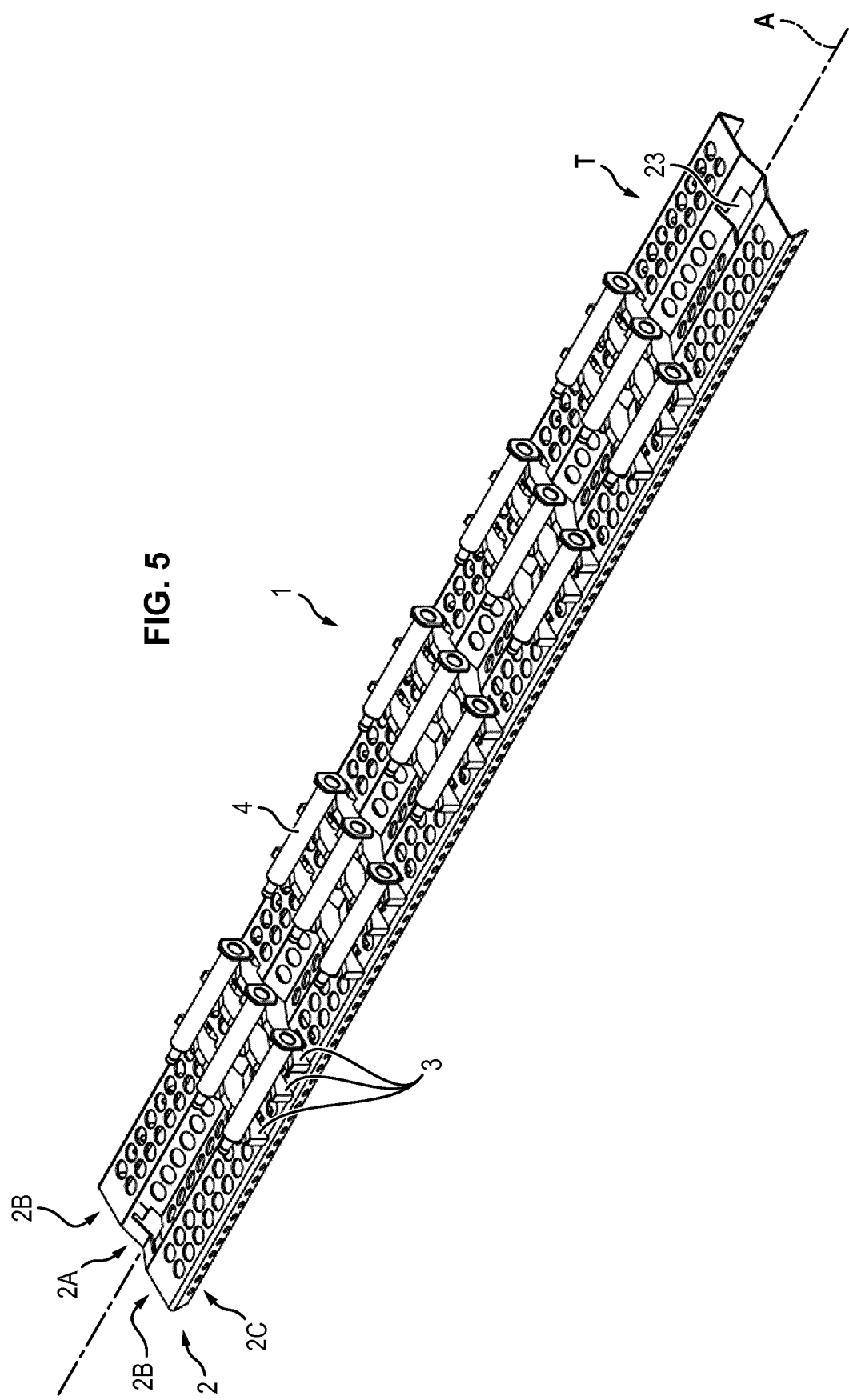
FIG. 5 is a perspective top view of the system according to FIG. 1 with glass containers positioned on it.

The transportation system 1 shown in FIG. 5 corresponds to an "in use" configuration, when the glass containers, as for example syringes 4, are placed onto the V-shaped seats 31 of the inserts 3. In this case, the transportation system is connected by the attaching grooves 23 to the driving system of the annealing oven (not shown). As it can been observed in FIG. 5, each syringe 4 is seated horizontally on at least two non-metallic inserts 3. Each syringe contacts the two inserts 3 on its barrel surface, therefore excluding any direct contact or interaction with the syringe extremities (i.e. the tip and/or the flange) with the insert 3 of the lath 2. This specific positioning of the glass containers on the inserts is valuable to avoid applying mechanical stress on the container extremities when such containers are carried on the transportation system. Additionally, it has been noticed that the use of non-metallic inserts induces less stress in the glass at the contact point where the containers are in direct contact with the inserts, avoiding the formation of scratches or microcracks. This ensures that no defects or weaknesses are produced on the thin and brittle extremities of the glass containers.

Figure 7:
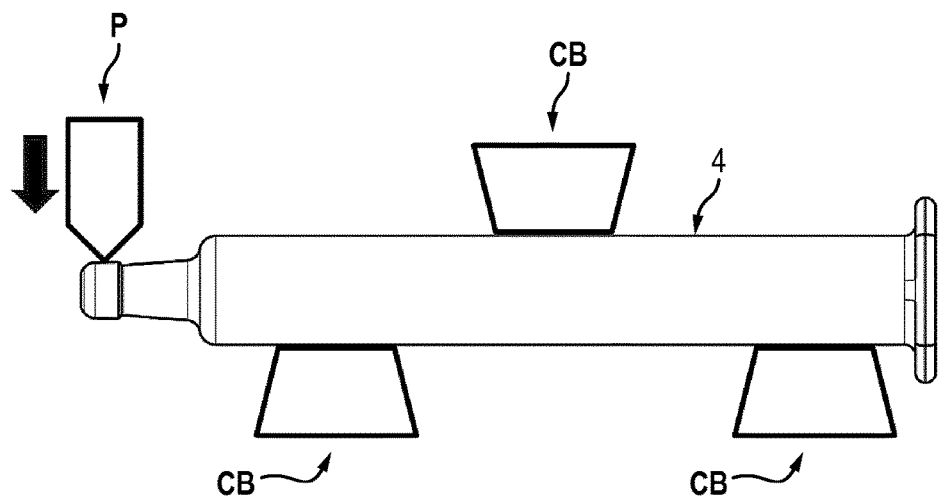
FIG. 7 is a diagram of an experiment to measure the tip strength of syringes.

This improvement has been demonstrated by investigating the tip resistance of 165 1 mL long syringes transported through an in-line annealing oven. Now referring to FIG. 7, the tip strength of syringes is generally measured by horizontally maintaining a syringe on a Llyod LRX compression bench CB and applying a compression pin P radially on the extremity of the tip portion. The pin P is perpendicularly pressed onto the tip portion of the syringe at a speed of 25 mm/min on a 5 mm depth until breakage, and the maximum load force, expressed in arbitrary units, is measured.

Figure 8:
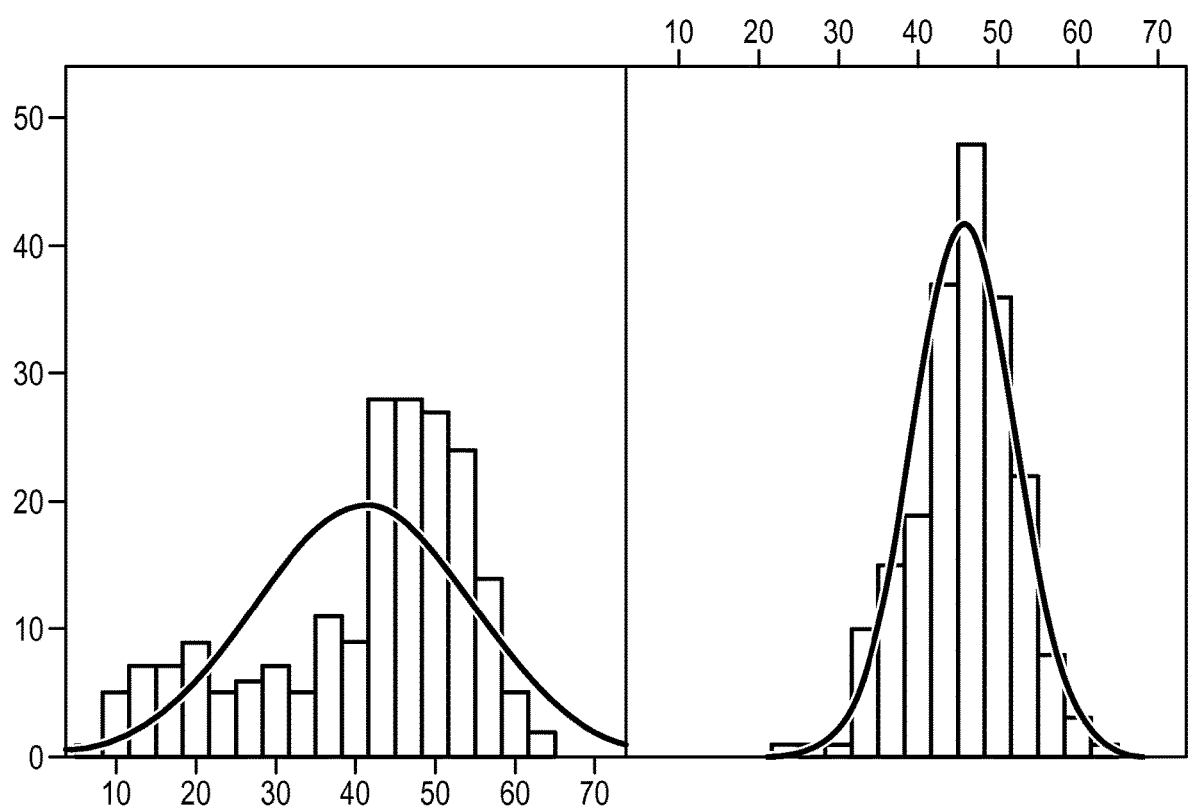
FIG. 8 is a graph representing the tip strength frequency of glass containers transported on a transportation system according to FIG. 1 ("New") compared to a prior-art transportation system ("Standard").

As shown in FIG. 8, the average tip strength (x-axis) of syringes carried on a transportation system according to the present invention (right box of the graph) increased from 41 u.a. to 44 u.a. (top of the Gaussian curves) in comparison to syringes transported on a prior-art system (left box), meaning an increase of about 7%. Furthermore, the y-axis being the population frequency, syringes having a tip strength below 30 u.a. almost disappeared and most of the syringes are now around 50 u.a. This results in a tip strength standard deviation decreasing of about 50%, as it appears from the width reduction of the Gaussian curves.

Additionally, the impact of the transportation system according to the present invention on the glass container eccentricity has been evaluated.

Figure 9:
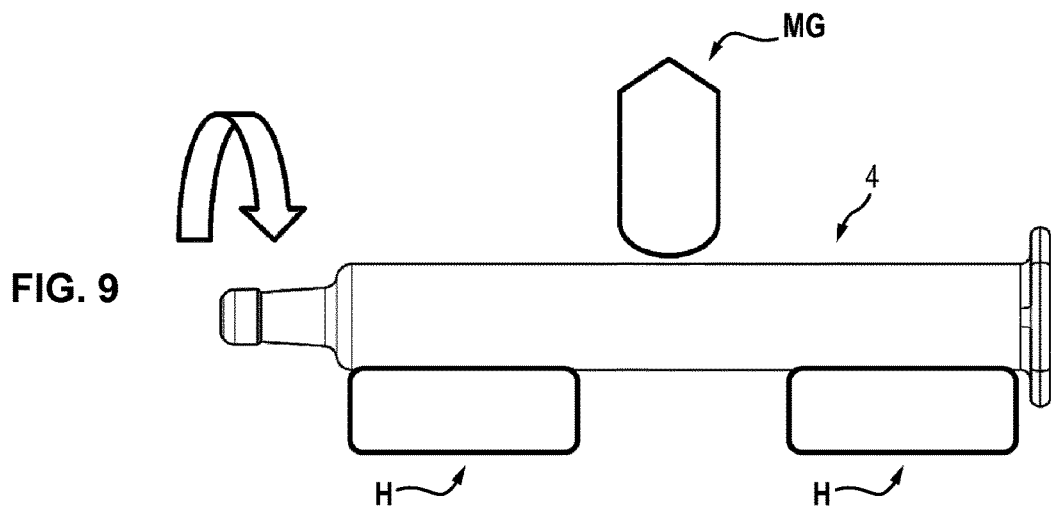
FIG. 9 is a diagram of an experiment to measure the eccentricity of syringes.

Referring to FIG. 9, the eccentricity has been measured by positioning horizontally a syringe 4 on a rotating holder H, the head of a micrometric gauge MG (Mitsutoyo, Japan) being in close contact with the surface of the barrel (more precisely the head of the gauge being placed at the half length of the syringe) in order to measure the axial displacement of the head and evaluate the curvature of the global shape of the syringe. The syringe is rotated on the rotating holder to find the highest point V1 of the syringe surface. When V1 is determined, the syringe is then turned of 180° and a second height V2 is measured. The value of eccentricity is then calculated by applying the following formula: (V1−V2)/2, in arbitrary units.

Figure 10A:
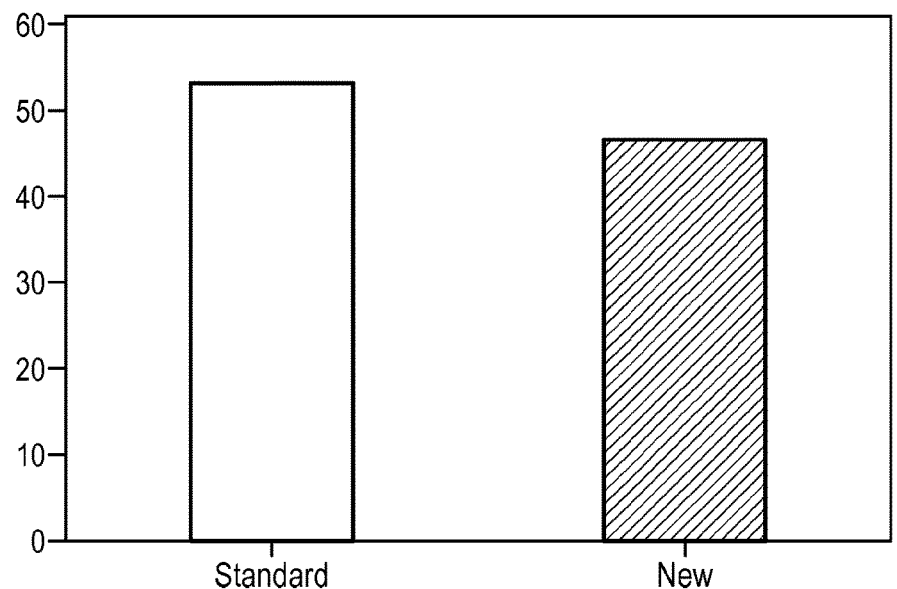
FIGS. 10A and 10B are graphs representing respectively the average eccentricity and the eccentricity standard deviation of glass containers transported on a transportation system according to FIG. 1 ("New") in comparison with a prior-art transportation system ("Standard").
Figure 10B:
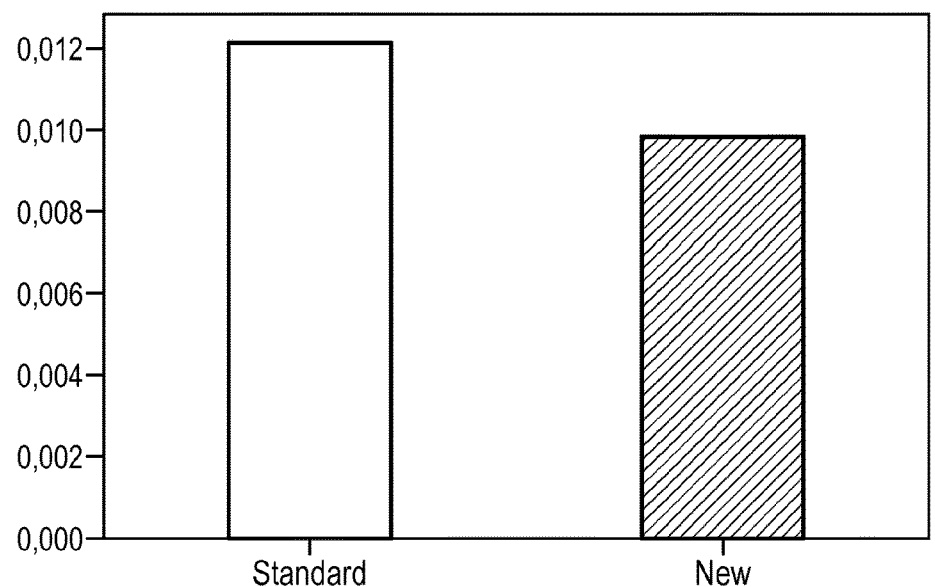

FIG. 10A shows the average eccentricity in arbitrary units and FIG. 10B the eccentricity standard deviation obtained for the 165 syringes that have been submitted to heat treatment when transported on a prior-art system or on the system of the present invention.

The syringes transported on a prior-art system are referred as "Standard" and the syringes transported on a transportation system according to the present invention are referred as "New". This experiment demonstrates that the eccentricity average value decreased of about 12% when the transportation system of the present invention was used. Furthermore, the eccentricity standard deviation also decreased of 18%. This experiment thus demonstrates that glass syringes, placed horizontally on a transportation system and submitted to an annealing treatment, keep their cylindrical shape when a transportation system according to the present invention is used.

These experiments thus demonstrated the high value and the industrial feasibility of a transportation system according to the present invention.

Besides, the specific geometry of the seat 31 further contributes to the stability of the glass containers 4 when they are carried on the transportation system 1. While the beveled seat geometry of the insert 3 as shown in FIG. 3 reduces the contact surface with the glass containers, the constant thickness of the seat 51 of the insert 5 shown in FIG. 6A contributes to the stabilization of the glass containers and thus decreases the number of defects generated during the transportation of the containers on the laths. Besides, the smooth seat 61 with its curved edge of the insert 6 shown in FIG. 6B contributes to reduce cosmetic defects and flaws in the glass container material. Any of these inserts may thus be chosen by the skilled person to solve specific problems such as vibrations, misalignment or cosmetic defects.

Finally, the transportation system 1 according to the present invention is also very flexible as it authorizes quick configuration exchanges. Indeed, since inserts are reversibly connected to the lath thanks to the presence of the securing means, the inserts may be removed with simple tools to be replaced quickly and easily. In this way, the type and number of inserts may be changed according to the type of containers that are produced but also according to the diameter and length of the glass containers. As a result, only a limited number of laths are required to sustain the manufacturing of a wide range of glass containers. In example, a batch of vials may be annealed in a short time after a batch of cartridges.

While the best embodiment of the present invention is described above, the skilled person would be able to design various variations of the present invention.

The invention claimed is:

1. A transportation system for annealing a glass container having a barrel and two extremities, said transportation system comprising:
    a lath provided with at least two non-metallic inserts, the at least two non-metallic inserts being positioned such that, when a glass container is seated on said lath, said glass container is exclusively held by contact between said at least two non-metallic inserts and said barrel in a substantially horizontal position which is fixed relative to the lath; and
    a securing element configured to reversibly firmly secure a clipping portion of said at least two non-metallic inserts into a respective slot of the lath.

2. The transportation system according to claim 1, wherein the slots are V-shaped.

3. The transportation system according to claim 1, wherein the lath further comprises two side portions and wherein the clipping portion of the inserts further comprises two abutment edges, each abutment edge being in abutment on one of the side portions of the lath, the two side portion and the abutment edges forming part of said securing element.

4. The transportation system according to claim 1, wherein the securing element comprises two oblique arms protruding into the slot in tight frictional contact with a lateral edge of the clipping portion of a respective insert accommodated in the slot.

5. The transportation system according to claim 1, wherein the inserts are made of carbon or ceramic.

6. The transportation system according to claim 1, wherein the inserts further comprise a seat portion having at least one seat intended to contact part of a glass container barrel.

7. The transportation system according to claim 6, wherein the at least one seat has a curved edge.

8. The transportation system according to claim 1, wherein the lath is made of stainless steel.

9. The transportation system according to claim 1, wherein the lath further defines a longitudinal symmetry axis and wherein the lath define at least two slots parallel to each other and perpendicular to said longitudinal symmetry axis.

10. The transportation system according to claim 1, wherein the lath comprises a central portion extending along a longitudinal axis of symmetry of said lath and two side portions located on both sides of said central portion, and the lath define at least two slots parallel to each other and extending through said central and side portions of the lath.

11. The transportation system according to claim 1, further comprising glass containers having a barrel and two extremities, wherein each glass container lies on at least two inserts only by a contact between said barrel and each of said at least two inserts.

12. A method for annealing a glass container having a barrel and two extremities, the method comprising:
    providing a transportation system according to claim 1,
    seating a glass container onto at least two non-metallic inserts firmly secured to the lath of the transportation system, so that the glass container is exclusively held by contact between said at least two non-metallic inserts and said barrel,
    carrying the at least one glass container toward an annealing oven via the transportation system, said at least one glass container being motionless relative to the transportation system.

* * * * *